United States Patent
Towe

(10) Patent No.: US 6,572,694 B2
(45) Date of Patent: Jun. 3, 2003

(54) PIGMENT EXTENDING COMPOSITION AND METHOD OF PRODUCTION THEREOF

(76) Inventor: Michael Towe, 2158 Montgomery, Suite A, Montreal Quebec H2K 2R8 (CA)

(*) Notice: Subject to any disclaimer, the term of this patent is extended or adjusted under 35 U.S.C. 154(b) by 53 days.

(21) Appl. No.: 09/855,902

(22) Filed: May 15, 2001

(65) Prior Publication Data

US 2002/0050228 A1 May 2, 2002

Related U.S. Application Data

(60) Provisional application No. 60/272,526, filed on May 15, 2000.

(51) Int. Cl.$^7$ ................................................ C04B 14/28
(52) U.S. Cl. ........................................ 106/464; 106/465
(58) Field of Search .................................. 106/464, 465

(56) References Cited

U.S. PATENT DOCUMENTS 5,273,578 A * 12/1993 Towe .......................... 106/464
5,312,484 A * 5/1994 Kaliski ........................ 106/416

* cited by examiner

Primary Examiner—Michael Marcheschi
(74) Attorney, Agent, or Firm—Collen IP; Laurence P. Colton

(57) ABSTRACT

A pigment composition for use as a substrate to produce ink, paints, and pigment compounds, the composition being made from an aqueous slurry containing about 17 to 40% calcium carbonate, based on the weight of said aqueous slurry, and an inorganic pigment from group comprising titanium dioxide, in which the amount of calcium carbonate is higher than that found in standard pigment compositions and the amount of amount of pigment is lower than that found in standard pigment compositions, yet there is not an appreciable degradation of the color, coating, and other qualities of the pigment composition.

30 Claims, No Drawings

PIGMENT EXTENDING COMPOSITION AND METHOD OF PRODUCTION THEREOF

CROSS REFERENCE TO RELATED APPLICATIONS

The present application claims priority on U.S. provisional patent application No. 60/272,526 filed on May 15, 2000.

BACKGROUND OF THE INVENTION

1. Technical Field

The present invention relates to surface coatings. In particular, the invention in its simplest form relates to a composition comprising a color pigment and a pigment spacer. Further, the present invention relates generally to the field of composite pigments, and relates more specifically to composite pigments comprising an inorganic pigment and calcium carbonate as a pigment extending composition.

2. Prior Art

Calcium carbonate ($CaCO_3$) has been used for hundreds of years in combination with colored pigments both as a finish on houses, such as whitewash, and by artists, who would bind pigments into freshly applied lime, known as fresco. Quite possibly, marble dust was mixed with pigment to achieve special color effects in oil-based artist paints and watercolors. There is very little documentation on this, as an artist's technology was closely guarded, rarely written down, and only passed on to his or her apprentice of sufficient skill and intention to become artists in their own right. This system maintained the secrecy of the technology and has largely been lost. Industry today largely still follows this apprenticeship system, with each company closely guarding their formulations to maintain market advantage.

Inks are both simple and complex. Inks are simple because the amount of pigment from one brand to another must deliver the same performance (the number of pages printed per unit of ink). Assuming equivalent cost, the brand of ink that produces the greatest number of printed pages will be preferred. Inks are complex because they have certain properties that must be controlled, as the transfer physics of ink must allow the ink to spread thinly, evenly, and without fault. Each company has their combinations of binders that allow modifications of the various properties of inks to compensate for changes in the raw materials used, as well as allowing changes to the properties of the inks for special applications (such as printing on plastics, uneven surfaces, difficult to apply surfaces, for example). However, the amount of pigment in a unit of ink will not change to produce the same number of printed pages.

Paints are significantly different from inks in so far as the final properties of paints are more variable. House or architectural paints must cover opaquely in as few coats as possible with the appropriate surface finish (gloss, matte, exterior, interior, solvent resistance, sun resistance, weather resistance, dirt resistance, scuff resistance, washability, chalking, for example). To formulate paint, one needs first a sufficient amount of pigment to give satisfactory opacity with a minimum number of applications. Each type of paint will have a range of formulation possibilities and will have to deliver the performance expected by the market place. An exterior paint for metal surfaces, such as tanks and containers, will have to protect the metal as well as give a durable shiny coating. In this case, pure pigments with as few fillers as possible will have to be used, as room must be left in the formulation to use a greater amount of gloss binder and rust inhibitors, surface cleaners, catalyzers, driers, and solvents, for example. Interior flat finish house paint can have much greater latitude in formulation. In this case, the flat or matte finish can be achieved by using less glossy binders, or by leaving particles on the surface of the paint that will scatter light (dry hide) or by using high surface area materials such as fumed silicas to scatter the light, diatomaceous skeletal powders to present sharp projections on the surface to scatter the light, or by carefully balancing the binders, pigments, and fillers to give a surface that appears flat but has scuff resistance and good washability, for example.

Both inks and paints have a range of formulation possibilities, and a great departure from the balanced characteristics of each system will not be tolerated by the industry or the consumer. As a consequence, the many thousands of formulators who have great experience in maintaining a viable coating system will not remove a major portion of one of the components of their formula and will not replace any major component with an even larger amount of other material, such as transparent fillers. Further, formulators are hesitant to explore changing the ratios of materials outside of the accepted range of performances for those materials. As a result, those skilled in the art would not expect a major boost in performance of the colored pigments by reducing the pigment loading by 25% and adding a transparent material twice the weight of the pigment removed. Thus, those skilled in the art would not have explored filler materials such as $CaCO_3$ looking for a sudden and counterintuitive boost in pigment performance.

As recently as the 1960's and 1970's much effort was directed towards boosting the performance of $TiO_2$ to give greater efficiencies. Microencapsulation was explored and the spacing of the $TiO_2$ was deemed critical to boosting performance. The gain at most was one or two percent. No one of skill in the art was looking for 35% gains in performance, as this was counterintuitive.

The demand and supply for titanium dioxide, which is a major and the most expensive component of titanium dioxide pigments, has continuously grown over the last 40 years and industry analysts project that the demand will increase between 3 and 4 percent per year through 2005. While the demand for titanium dioxide is growing, the supply of titanium dioxide may not be able to keep up with the growing demand because the supply may remain limited due to limitations in the operating capacity.

As a consequence of the supply and demand divergence, the price of titanium dioxide and titanium dioxide pigments is likely to elevate over the next years. Despite major plans by the titanium dioxide ($TiO_2$) producers to increase production, such increases may not be immediate or affect the supply immediately. The producers to justify adding newer $TiO_2$ capacity and to compensate for the price increase in the raw material costs could seek price hikes. These price hikes will make the most expensive part of titanium dioxide pigments even more expensive.

Because of potentially rising price of titanium dioxide and the limited supply of titanium dioxide, there is a need for pigment technology that can use less of the expensive titanium dioxide in the pigment without sacrificing significant amount of pigment quality. However, the optical activity of a pigment composition is affected by the dispersion of a pigment within a pigment composition. Thus, flocculation of pigment will reduce the optical intensity of the ink.

The prior art discloses technology that attempts to use less of the expensive component.

U.S. Pat. No. 2,877,130 to Caron et al. discloses a paint-base material that is devoid of hiding powers in the absence of an active pigment. Caron '130 discloses a paint-base composition, which can comprise between 22 to 56% of a final pigmented paint composition that can include an extender such as calcium carbonate, which can vary from 12 to 40%. In the examples disclosing final paint formulas, Caron '130 includes formulas containing less than 17% calcium carbonate of the total pigment composition. Although Caron '130 discloses a calcium carbonate range, it only discloses a paint-base (rather than a paint) and the disclosed final paint formulas contain less than 17% calcium carbonate.

U.S. Pat. No. 4,826,535 to Godly discloses tempera paint or a water-based composition that can be removed during normal washing. The composition disclosed in Godly '535 includes a carbon dioxide liberating substance, which upon contact with water produces carbon dioxide, which will remove the paint from clothing. Godly '535 claims a paint composition, which comprises an extender (such as calcium carbonate) in the amount between 10 and 30% by weight. Within this extender range in Godly '535, diatomaceous silica is present in an amount ranging from 10 to 15 percent. Specifically, the Godly '535 examples disclose the use of calcium carbonate varying from 14.44 to 15.53%, while the Godley '535 specification discloses that calcium carbonate or other fillers can be added between 10 and 18%. Thus, Godly '535 discloses a water-based paint that limits the amount of pigment to between 0.8 and 2.0% by weight.

U.S. Pat. No. 5,120,365 to Kogler discloses a new pigment mixture consisting of 40–80% by weight calcium carbonate and or dolomite, 20–60% by weight talc, or 20–60% of a talc-kaolin mixture that give substantial improvements in the use production of lightweight coated rotogravure papers. The calcium carbonate mixture in Kogler '365 does not fall below the 20% range, and in general is a fairly high percentage by weight of talc.

U.S. Pat. No. 5,151,124 to Rice discloses a method for forming a hydrothermal aggregated kaolin clay pigment comprising preparing an aqueous slurry of a particulate kaolin clay, sodium silicate, and finely divided calcium carbonate having a total solid concentration of 10 to 20% by weight. Rice '124 does not disclose the use of titanium dioxide materials and is in the field of paper filling and coating.

U.S. Pat. No. 5,273,578 to the present inventor Towe discloses a light-modifying composition that basically comprises a color pigment and a gray pigment that is able to absorb light and reflect at least a part of the light absorbed. The gray pigment must be of a certain quality and light reflecting capability, and of a certain particle size.

U.S. Pat. No. 5,486,233 to Mitchell et al. discloses a pigment composition that includes a pigment extender, which optionally includes a pigment, and further includes a non-hydrogenated phospholipid material, such as non-hydrogenated lecithin, and a surface modifying agent. Mitchell '233 discloses a pigment extender, which can include calcium carbonate that may vary from 70 to 99.9% by weight. Mitchell '233 discloses a very high calcium carbonate component.

U.S. Pat. No. 5,551,975 to Freeman et al. discloses pigments for use in paper comprising structured aggregate clays which are reaction products of kaolin clays and colloidal silicas, which provide unique properties. This patent is distinct subject matter from the present invention.

U.S. Pat. Nos. 5,554,215 and 5,509,960 to Simpson et al. disclose a composite particulate pigmentary material that comprises at least two chemically distinct materials in which the particles of one material carries a positive surface charge and the particles of the second material carries a negative surface charge. Simpson '215 and '960 disclose methods for preparing the composite pigment, which can be useful in, for example, paints, inks, paper, and plastics. Simpson '215 suggests the use of titanium dioxide with calcium carbonate. However, these patents do not suggest using a percent of calcium carbonate higher than 17 percent. More specifically, neither Simpson '215 nor Simpson '960 suggests that an elevation in the calcium carbonate percentage can compensate for a reduction titanium dioxide.

U.S. Pat. No. 560,568 to Naydowski et al. discloses a calcium carbonate coating pigment slurry consisting of calcium carbonate, talc, $H_2O$, and coating pigment. Naydowski '568 is the in the field of coating paper for gravure printing and does not disclose an extender pigment that is compatible with titanium dioxide, i.e., for a pigment less than 0.4 $\mu$m in diameter.

U.S. Pat. No. 5,690,728 to Ravishankar discloses a structured composite pigment composed of titanium dioxide, calcinated clays, and polyaluminum chloride. A process is disclosed for producing an aggregated composite premium pigment having superior optical, physical, and dispersion characteristics for papermaking applications. Ravishankar '728 is directed primarily at calcinated clays, including calcium carbonate as extenders, in concentrations greater than 40% of weight.

U.S. Pat. No. 5,755,870 to Ravishankar discloses a process for making composite aggregate pigments (CAPs) having optical and dispersion characteristics. These CAPs are produced by aggregating titanium dioxide and calcinated clay with zirconium hydroxy complex chemicals in a slurry. Ravishankar '870 discloses a composition containing up to 20% calcium carbonate. Although Ravishankar '870 discloses that up to 49.5% by weight of calcinated clay can be replaced by one form of calcium carbonate in the method, Ravishankar '870 is distinctly applied to conventional and special coating applications in paper, paint, plastics, and rubbers industries, which is distinct from the field of inks.

U.S. Pat. No. 5,882,396 to Hiorns discloses an inorganic particulate material for use as a pigment material in a paper coating composition. The paper coating material in Hiorns '396 can be between 4 to 20% by weight particulate or calcium carbonate. Hiorns '396 is in the field of paper coating pigments and does not disclose a relationship between the color pigment and an extender.

U.S. Pat. No. 5,989,332 to Weitzel et al. discloses a carbonate-containing pigment slurry that contains water, carbonate-containing pigment, and 25 to 70% of by weight of a dispersant. The slurry is incorporated in a final composition that is composed of nearly 100% agglomerated carbonate-containing pigment wherein 0.1 to 1.0% by weight is dispersant. Weitzel '332 is not in the range of 17 to 40% calcium carbonate by weight.

The present reference and its incorporated references disclose a novel ink pigment composition that is distinct from the prior art in ways including, but not limited to, its composition. Although the prior art discloses calcium carbonate and pigments in a pigment composition, the prior art does not disclose compensating reduced amounts of titanium dioxide with increased amounts of calcium carbonate for use in inks. Specifically, the prior art does not explore manipulation of the ratio of pigment to filler outside the accepted ranges. More importantly, the prior art does not disclose pigment materials with calcium carbonate in the ranger of 17 to 40% by weight.

Thus, it can be seen that there exists a need for pigment materials using calcium carbonate as a pigment extending composition in the range of 17 to 40% by weight. The present invention used calcium carbonate in such a manner, and it is to this end that the present invention is directed.

BRIEF SUMMARY OF THE INVENTION

The inventor has surprisingly discovered an ink pigment composition that has similar effects than the inventor's previous light-modifying composition as disclosed and claimed in U.S. Pat. No. 5,273,578 but that does not require the use of a gray pigment. More precisely, the composition of the present invention relates to a pigment extending composition comprising a color pigment and a pigment spacer component such as calcium carbonate within a size range of 0.01 microns to 10 microns and which is bound together in a paint film, ink film, plastic film or any material, essentially transparent, that will hold the pigments and spacers in one position.

The pigment spacer component must be used in a sufficiently high concentration, parts by weight of the total composition of at least 17% and up to 40%, and preferably between 18% and 30%. The result of such a ratio allows the pigment to be reduced by 15% to 50% or more depending on the pigment concentration. In water-based ink, the pigment component is 10% of the weight of the ink and removing 20% of the pigment requires the addition of 8 times the weight of the pigment removed. For example, if the pigment weighs 10 grams, then 2 grams of pigment can be removed and replaced with a minimum of 16 grams of calcium carbonate. The resulting color composition will then resemble the original composition in color intensity and will look the same. When a bleach test is done where a measured amount of titanium dioxide pigment is added to each, the composition that is reduced in pigment will appear considerably lighter in tint, revealing a lower concentration of pigment. This effect has been seen in calcium carbonate, but can be found in other materials as well, such as granite, feldspar and quartz.

It is an object of the present invention to provide a pigment composition that can be manufactured less expensive by allowing for the substitution of the more expensive titanium dioxide for calcium carbonate.

It is another object of the present invention to provide a pigment composition that reduces the $TiO_2$ consumption cost effectively without significantly sacrificing the desired optical and handling performance in a given end application.

It is another object of the present invention to provide a pigment composition that possesses superior light scattering properties and in which flocculation of like particles is reduced in comparison to many conventional pigments.

It is another object of the present invention to provide a pigment composition that is less expensive to manufacture, contains lesser quantities of more expensive and more scarce materials and greater quantities of less expensive and less scarce materials, yet provides the same or acceptably similar optical (color, tint and opacity, for example) qualities as more expensive pigment compositions.

These objects, and other objects, features and advantages of the present invention, will become more apparent to those of ordinary skill in the art when the following detailed description of the preferred embodiments is read.

DETAILED DESCRIPTION OF THE PREFERRED EMBODIMENTS

Although $CaCO_3$ is a common material widely used, it is counterintuitive to use more than a small amount in ink and paint formulations. Those skilled in the art generally assume that modifying a balanced opaque paint with transparent $CaCO_3$ will result in a loss of opacity. Similarly, diluting the pigment in an ink will result in a drop in printing performance (less pages printed). However the inventor has found, surprisingly and counterintuitively, that when $CaCO_3$ is used in sufficient volume, dilution does not occur to any appreciable extent, and there is a relatively large cost savings due to the need for use of the more expensive pigments. Although putting this amount of $CaCO_3$ does result in a slight loss of gloss, in many type of inks and paints, this is acceptable, especially in light of the significant cost savings and the increase in the consumer's choice of alternative coatings.

The actual mechanism in $CaCO_3$ is not known, but there are a few facts about $CaCO_3$ that could explain this phenomenon. When light passes through $CaCO_3$, it splits into a major axis and a minor axis. In a pure calcite crystal, the result is two images coming out of the crystal. The index of refraction is different in each axis, the minor axis being longer and therefore a higher index of refraction. This may result in the color of the light being changed, with the minor axis light being redder than the major axis light. This would present a greater variety of light energies to the pigment particles, resulting in a more complex reflection off of the pigments. The resulting light the observer sees would be richer and this extra volume of color could result in a lowering of the pigment volume needed to give a particular color. A complicating factor in this is that changing the crystal form of $CaCO_3$ to an aragonite crystal does not affect the color performance. Perhaps the bifurcation of the light still operates in the aragonite crystals. Certainly the calcite in marble produces beautiful colors, but also the aragonite in seashells produces beautiful colors as well. It should be noted that $CaCO_3$ is one of the few molecules that is capable of producing rich colors in stone with only small amounts of impurities.

The preferred embodiment of the composite material comprises at least at least two chemically distinct materials. The first is a pigmentary component that provides for the light dispersion. The second is the filler or extender that function to spread. The most preferred embodiments of the present invention comprise an aggregation of titanium dioxide with at least one form of calcium carbonate.

In the preferred embodiment, the pigmentary component can be any particulate material. Inorganic pigments are preferred and include but are not limited to titanium dioxide pigments, zinc oxide pigments, antimony oxides, barium pigments, calcium pigments, zirconium pigments, chromium pigments, iron pigments, magnesium pigments, lead pigments, zinc sulphide and lithopone.

The preferred size of the particulate materials depends to some extent on the nature of the particles. Where one of the particulate materials is included in the composite for the purpose of providing the principal pigmentary effect then the average primary particle size will preferably be the size that provides optimum pigmentary properties for the material employed. For example, when a titanium dioxide pigment is used as one of the particulate materials then its average crystal size is preferably between about 0.05 and 0.5 micron. For rutile titanium dioxide the average crystal size is most preferably between 0.2 and 0.3 micron and for anatase titanium dioxide the average crystal size is most preferably between 0.1 and 0.35 micron.

The $CaCO_3$ preferably is in the form of a ground powder. It has been found that particle sizes ranging from 0.01 to 40 microns function suitably, with particle sizes ranging from 0.01 to 10 microns being preferred, and 0.1 to 1 microns being the most preferred. The amount of $CaCO_3$ used in the present invention is generally variable, and preferably is based on the amount of pigment used. Specifically, it has been found that a pigment to $CaCO_3$ ratio of between 1:2 to 1:20 functions suitably, with a ratio of between 1:4 to 1:16 being preferred. Those of ordinary skill in the art can arrive at a suitable ratio for a desired set of characteristics (color, tint, tone, opacity, etc.) without undue experimentation by varying the ratio of pigment to $CaCO_3$. It has been found that starting at a ratio of 1:10 and varying the ratio from there provides excellent results.

Various color pigments can be used in the composition of the present invention. The color pigment can be either inorganic or organic, depending on the contemplated application. Suitable inorganic pigments include oxides such as natural or synthetic colored iron oxides or chromium oxides, chromates such as lead chromate and chrome green, cadmium, ferriferrocyanide, ultramarine, mercuric sulfide and synthetic inorganic complexes, to name a few representative examples. Suitable organic pigments include nitroso, nitromonoazo, diazo, disazo, basic dye, alkali blues, peacock blue lake, phloxine, quinacridones, lake of acid yellow, carbazole dioxazine violet, alizarine lake, vat, phthalocyanine and tetrachloroisoindolinone, to name a few representative examples. Metallic pigments also can be used, including aluminum flakes, copper and copper alloy flake powders, zinc pigments and stainless steel flakes, to name a few representative examples. Metal protective pigments, nacreous pigments, luminescent pigments, functional pigments and food, drug and cosmetic colors also are suitable for use in this invention.

Binders commonly are used in pigment compositions, and can be used in this invention. A wide variety of binders can be used, such as oils, varnishes, latex emulsions styrene, styrene butadiene, polyvinyl acetate, acrylic, acrylic-styrene, acrylic polyvinyl acetate and poylurethanes, to name a few representative examples. The choice and amount of binder is well within the knowledge of those of ordinary skill in the art.

Additives also commonly are used in pigment compositions to impart different, unusual or special properties to the final product depending on the use of the final product, and can be used in this invention. A wide variety of additives can be used, including dispersants, surfactants, defoamers, thickeners and the like, to name a few representative examples. The choice and amount of additives is dictated by the end use of the final product and is well within the knowledge of those of ordinary skill in the art.

Other materials, which can be used as one of the particulate materials, are extenders or fillers such as silica, silicates, aluminates, sulphates, carbonates, or clays. Non-pigmentary forms of the compounds mentioned above as pigments may also be used as one component of the composite. The preferred materials disclosed above are meant to be exemplary only and not limiting. It should be appreciated that the component materials of the present invention are not restricted to these materials, or the materials disclosed in the representative examples below. For example, as disclosed above, a wide variety of binders and color pigments can be used in the overall composite pigment and the present disclosure is not to be interpreted as being limited to the components disclosed herein.

INK EXAMPLES

The following examples illustrate preparation and processing methods as well as properties the pigmentary composition. The pigments used were of the dispersion variety containing 38–45% pigment by weight. However, the results are applicable to other types of inks. The following examples are not intended to limit or depart from the scope and spirit of the invention.

The several components of the pigment compositions of this invention are mixed together in no particular order and under no particular conditions. For the examples below, the pigment compositions were prepared by first producing a slurry of the $CaCO_3$ essentially to disperse the $CaCO_3$ in the solvent. This is done by mixing the $CaCO_3$ with the solvent, typically water, oils or a long chain alcohol such as propylene glycol or ethylene glycol, together with suitable additives, (such as for example wetting agents, dispersants, surfactants, defoamers and/or thickeners and the like) required to produce and maintain a uniform slurry. The mixing time can vary depending on the additives used but should be sufficient to adequately disperse the $CaCO_3$ particle within the slurry. The choice and use of solvent and additives, and the mixing time and conditions are within the knowledge of those of ordinary skill in the art.

Binders and/or additives then are added to the slurry depending on the desired characteristics for the final coating. As disclosed above, additives such as thickeners, preservatives, defoamers, buffers to maintain a desired pH, coalescents and the like can be added.

After the binders and/or additives have been added to the slurry, the color pigment is added. As can be seen in the following examples, the amount of color pigment added to the new formulations of this invention is significantly reduced when compared to the amount of color pigment commonly added to the standard formulations known in the art.

The method disclosed above and followed in the examples below is to be viewed as a general guide for the preparation of the pigment composition of this invention, and many modifications are possible and within the knowledge of those of ordinary skill in the art depending on the end use of the pigment composition. Such modifications fall within the scope and spirit of this invention.

| Example 1 - Magenta Ink 1 | | | |
| --- | --- | --- | --- |
| Standard Formulation (% by weight) | | New Formulation (% by weight) | |
| Solvents | 32.40 | Solvents | 27.40 |
| Filler | 10.00 | $CaCO_3$ | 25.00 |
| Binder | 33.10 | Binder | 29.20 |
| Pigments | 20.90 | Pigments | 14.80 |
| Additive | 3.60 | Additive | 3.60 |
| Color Reading (comparison) | | | |
| $\Delta L$ | +0.23 | | |
| $\Delta a$ | +0.95 | | |
| $\Delta b$ | −1.24 | | |
| $\Delta E$ | +1.58 | | |

The reduction in pigment in this example was 6.10% (20.90%–14.80%), or 61 grams in a kilogram of ink. Using 40% as the basic average pigment content, the reduction in quantity of pigment was 24.4 grams (61 grams×40%). The new formulation contains 25% $CaCO_3$, or 250 grams in a kilogram of ink. As a result, 10.2 times the weight of the reduced pigment was replaced by $CaCO_3$ (250 grams $CaCO_3$/24.4 grams pigment=10.2).

| Example 2 - Yellow Ink 1 | | | |
|---|---|---|---|
| Standard Formulation (% by weight) | | New Formulation (% by weight) | |
| Solvents | 32.00 | Solvents | 26.93 |
| Filler | 13.00 | CaCO$_3$ | 27.00 |
| Binder | 28.60 | Binder | 28.00 |
| Pigments | 22.90 | Pigments | 14.57 |
| Additive | 3.50 | Additive | 3.50 |
| Color Reading (comparison) | | | |
| ΔL | −0.06 | | |
| Δa | +0.42 | | |
| Δb | +0.96 | | |
| ΔE | +1.05 | | |

Using the same calculations, 8.1 times the weight of the reduced pigment was replaced by CaCO$_3$.

| Example 3 - Orange Ink 1 | | | |
|---|---|---|---|
| Standard Formulation (% by weight) | | New Formulation (% by weight) | |
| Solvents | 24.00 | Solvents | 21.65 |
| Filler | 9.00 | CaCO$_3$ | 25.00 |
| Binder | 25.00 | Binder | 23.00 |
| Pigments | 38.50 | Pigments | 26.75 |
| Additive | 3.50 | Additive | 3.60 |
| Color Reading (comparison) | | | |
| ΔL | −0.07 | | |
| Δa | +0.48 | | |
| Δb | +2.86 | | |
| ΔE | +2.90 | | |

Using the same calculations, 5.3 times the weight of the reduced pigment was replaced by CaCO$_3$.

| Example 4 - Red Ink 1 | | | |
|---|---|---|---|
| Standard Formulation (% by weight) | | New Formulation (% by weight) | |
| Solvents | 31.40 | Solvents | 25.50 |
| Filler | 7.57 | CaCO$_3$ | 25.00 |
| Binder | 30.98 | Binder | 28.00 |
| Pigments | 25.29 | Pigments | 17.70 |
| Additive | 4.76 | Additive | 3.80 |
| Color Reading (comparison) | | | |
| ΔL | −0.01 | | |
| Δa | +1.41 | | |
| Δb | +0.66 | | |
| ΔE | +1.56 | | |

Using the same calculations, 5.58 times the weight of the reduced pigment was replaced by CaCO$_3$.

| Example 5 - Blue Ink 1 | | | |
|---|---|---|---|
| Standard Formulation (% by weight) | | New Formulation (% by weight) | |
| Solvents | 27.20 | Solvents | 22.10 |
| Filler | 6.00 | CaCO$_3$ | 27.80 |
| Binder | 28.00 | Binder | 24.50 |
| Pigments | 35.30 | Pigments | 21.90 |
| Additive | 3.50 | Additive | 3.70 |
| Color Reading (comparison) | | | |
| ΔL | −1.33 | | |
| Δa | +0.46 | | |
| Δb | −0.54 | | |
| ΔE | +1.51 | | |

Using the same calculations, 5.18 times the weight of the reduced pigment was replaced by CaCO$_3$.

| Example 6 - Red Ink 2 | | | |
|---|---|---|---|
| Standard Formulation (% by weight) | | New Formulation (% by weight) | |
| Solvents | 29.00 | Solvents | 27.40 |
| Filler | 10.00 | CaCO$_3$ | 25.00 |
| Binder | 27.30 | Binder | 25.00 |
| Pigments | 30.20 | Pigments | 19.00 |
| Additive | 3.50 | Additive | 3.60 |
| Color Reading (comparison) | | | |
| ΔL | +0.40 | | |
| Δa | +2.14 | | |
| Δb | +2.10 | | |
| ΔE | +3.02 | | |

Using the same calculations, 5.58 times the weight of the reduced pigment was replaced by CaCO$_3$.

| Example 6 - Green Ink 1 | | | |
|---|---|---|---|
| Standard Formulation (% by weight) | | New Formulation (% by weight) | |
| Solvents | 32.30 | Solvents | 29.00 |
| Filler | 12.10 | CaCO$_3$ | 25.00 |
| Binder | 28.50 | Binder | 25.50 |
| Pigments | 23.95 | Pigments | 16.90 |
| Additive | 3.60 | Additive | 3.60 |
| Color Reading (comparison) | | | |
| ΔL | −0.06 | | |
| Δa | −0.47 | | |
| Δb | −0.14 | | |
| ΔE | +0.49 | | |

Using the same calculations, 8.8 times the weight of the reduced pigment was replaced by CaCO$_3$.

Example 7 - Green Ink 2

| Standard Formulation (% by weight) | | New Formulation (% by weight) | |
| --- | --- | --- | --- |
| Solvents | 30.30 | Solvents | 26.00 |
| Filler | 7.50 | CaCO$_3$ | 25.00 |
| Binder | 28.80 | Binder | 23.60 |
| Pigments | 29.80 | Pigments | 21.90 |
| Additive | 3.60 | Additive | 3.50 |

| Color Reading (comparison) | |
| --- | --- |
| ΔL | +0.16 |
| Δa | −1.58 |
| Δb | +0.38 |
| ΔE | +1.63 |

Using the same calculations, 7.9 times the weight of the reduced pigment was replaced by CaCO$_3$.

Example 8 - Blue Ink 2

| Standard Formulation (% by weight) | | New Formulation (% by weight) | |
| --- | --- | --- | --- |
| Solvents | 25.60 | Solvents | 23.10 |
| Filler | 3.50 | CaCO$_3$ | 25.00 |
| Binder | 26.00 | Binder | 24.40 |
| Pigments | 40.30 | Pigments | 23.90 |
| Additive | 4.60 | Additive | 3.60 |

| Color Reading (comparison) | |
| --- | --- |
| ΔL | +0.04 |
| Δa | −0.91 |
| Δb | −2.21 |
| ΔE | +2.39 |

Using the same calculations, 3.8 times the weight of the reduced pigment was replaced by CaCO$_3$.

Example 9 - Orange Ink 2

| Standard Formulation (% by weight) | | New Formulation (% by weight) | |
| --- | --- | --- | --- |
| Solvents | 20.10 | Solvents | 19.40 |
| Filler | 5.00 | CaCO$_3$ | 25.00 |
| Binder | 20.60 | Binder | 18.20 |
| Pigments | 50.20 | Pigments | 34.80 |
| Additive | 4.10 | Additive | 2.60 |

| Color Reading (comparison) | |
| --- | --- |
| ΔL | +0.10 |
| Δa | +0.40 |
| Δb | +2.56 |
| ΔE | +2.59 |

Using the same calculations, 4.1 times the weight of the reduced pigment was replaced by CaCO$_3$.

Paint Examples

The following examples illustrate preparation and processing methods as well as properties the pigmentary composition. The examples are for a semi-gloss latex interior house paint. However, the results are applicable to other types of paints. The following examples are not intended to limit or depart from the scope and spirit of the invention.

| Component | A - New Formulation (lbs) | B - Standard Pigmented Base (lbs) |
| --- | --- | --- |
| The following components are mixed together in no particular order and under no particular conditions: | | |
| Water | 4.27 | 4.27 |
| Glycol | 1.86 | 1.86 |
| Acid | 0.008 | 0.008 |
| Preservative | 0.08 | 0.08 |
| Thickener | 0.04 | 0.04 |
| Dispersant | 0.83 | 0.83 |
| Buffer | 0.24 | 0.24 |
| Surfactant | 0.23 | 0.23 |
| Defoamer | 0.08 | 0.08 |
| CaCO$_3$ | 20.61 | 9.66 |
| TiO$_2$ | 2.06 | 12.59 |
| Disperse the above components for 15–20 minutes and then add: | | |
| Water | 31.7 | 31.7 |
| Coalescent | 1.66 | 1.66 |
| Cellulose Thickener | 14.0 | 14.0 |
| Binders | 35.65 | 35.65 |
| Dispersant | 0.23 | 0.23 |
| Defoamer | 0.33 | 0.33 |

As can be seen, the differences between the new formulation (A) and the standard pigmented base (B) are a significant increase in the amount of CaCO$_3$ and a significant decrease in the amount of TiO$_2$. Specifically, the new formulation has over twice the amount of CaCO$_3$ and less than one-fifth the amount of TiO$_3$ when compared to the standard pigmented base. In the new formulation, the amount of TiO$_2$ is based on 10% of the amount of CaCO$_3$.

The two bases, new formulation A and standard pigmented base B, were mixed in a particular ratio, which then produced the novel effect. This mixing method was developed to show that, with all other factors being equal, mixing 40% by volume of Base A with 60% by volume of Base B would result in a significant savings of colored pigment without a significant change in the color of the paint. Further, a small amount of the colored pigment (not TiO$_2$) was added to Base A to adjust the reflectivity L to equalize the mixing of Base A and Base B. This was included in the calculations.

Example 11 - Magenta Paint

| Component | Standard Formulation (ml) | New Formulation (ml) |
| --- | --- | --- |
| Base A | 0 | 147.8 |
| Base B | 147.8 | 0 |
| Magenta Pigment Paste | 5.47 | 0.73 |
| Maroon Pigment Paste | 1.34 | 0.17 |
| White Pigment Paste | 1.73 | 0 |

60 ml of the Standard Formulation was mixed with 40 ml of the New Formulation. The mixture was drawn down onto a Leneta sheet and color readings were taken when dry:

| Readings | 1 | 2 | 3 |
|---|---|---|---|
| ΔL | +1.01 | +0.86 | +1.13 |
| Δa | −0.64 | −1.17 | −0.64 |
| Δb | +1.28 | +0.64 | +1.36 |
| ΔE | +1.75 | +1.58 | +1.88 |

The mixed base comprised 4.45 ml of pigment (Base B has a total of 6.81 ml of colored pigment, Base A has a total of 0.90 ml of colored pigment, and 60%×6.81 ml plus 40%×0.90 ml equals 4.45 ml). Thus, the mixed base has 2.36 ml less colored pigment than an equivalent amount of Standard Formulation, which is equal to a savings of 34% colored pigment.

Example 12 - Green Paint

| Component | Standard Formulation (ml) | New Formulation (ml) |
|---|---|---|
| Base A | 0 | 147.8 |
| Base B | 147.8 | 0 |
| Yellow Pigment Paste | 5.48 | 0.80 |
| Blue Pigment Paste | 2.69 | 0.39 |
| White Pigment Paste | 0.288 | 0 |

60 ml of the Standard Formulation was mixed with 40 ml of the New Formulation. The mixture was drawn down onto a Leneta sheet and color readings were taken when dry:

| Readings | 1 | 2 | 3 |
|---|---|---|---|
| ΔL | +0.47 | +0.89 | +0.79 |
| Δa | +2.73 | +3.34 | +2.40 |
| Δb | +0.83 | +0.69 | +1.02 |
| ΔE | +2.89 | +3.52 | +2.73 |

The mixed base comprised 5.38 ml of pigment (Base B has a total of 8.17 ml of colored pigment, Base A has a total of 1.19 ml of colored pigment, and 60%×8.17 ml plus 40%×1.19 ml equals 5.38 ml). Thus, the mixed base has 2.79 ml less colored pigment than an equivalent amount of Standard Formulation, which is equal to a savings of 34% colored pigment.

Example 13 - Blue Paint

| Component | Standard Formulation (ml) | New Formulation (ml) |
|---|---|---|
| Base A | 0 | 147.8 |
| Base B | 147.8 | 0 |
| Blue Pigment Paste | 7.00 | 0.95 |
| White Pigment Paste | 1.54 | 0 |

60 ml of the Standard Formulation was mixed with 40 ml of the New Formulation. The mixture was drawn down onto a Leneta sheet and color readings were taken when dry:

| Readings | 1 | 2 | 3 |
|---|---|---|---|
| ΔL | +0.21 | +0.72 | +0.60 |
| Δa | +2.50 | +2.97 | +2.34 |
| Δb | +1.85 | +1.86 | +2.09 |
| ΔE | +3.12 | +3.58 | +3.20 |

The mixed base comprised 4.58 ml of pigment (Base B has a total of 7.00 ml of colored pigment, Base A has a total of 0.95 ml of colored pigment, and 60%×7.00 ml plus 40%×0.95 ml equals 4.58 ml). Thus, the mixed base has 2.42 ml less colored pigment than an equivalent amount of Standard Formulation, which is equal to a savings of 34% colored pigment.

Thus, it can be seen that the new coating formulations have a significantly reduced quantity of pigment and a significantly increased quantity of $CaCO_3$, yet do not suffer any appreciable reduction in optical quality. This counter-intuitive result leads to the ability to formulate pigment compositions having traditional color and coating qualities at a significantly reduced cost and using more readily available materials.

The above disclosure and representative examples are meant to be illustrative of the invention and not to limit the scope or spirit of the invention as defined by the appended claims and their equivalents.

What is claimed is:

1. A pigment composition, free of gray pigments, comprising:
    (a) an aqueous slurry that comprises about 17 to 40% calcium carbonate ($CaCO_3$), based on the weight of said aqueous slurry, as a pigment extender component, and
    (b) a pigment,
    whereby the refraction of light does not substantially change relative to the amount of calcium carbonate in the aqueous slurry and increased amounts of said calcium carbonate compensates for decreased amounts of said pigment.

2. The pigment composition as characterized in claim 1, wherein said aqueous slurry comprises between 18% and 30% calcium carbonate, based on the weight of said aqueous slurry.

3. The pigment composition as characterized in claim 1, wherein the pigment of (b) is an inorganic pigment selected from the group consisting of titanium dioxide pigments, zinc oxide pigments, antimony oxides, barium pigments, calcium pigments, zirconium pigments, chromium pigments, iron pigments, magnesium pigments, lead pigments, zinc sulphide and lithopone.

4. The pigment composition as characterized in claim 3, wherein the inorganic pigment has an average crystal size of between about 0.05 and 0.5 micron.

5. The pigment composition as characterized in claim 4, wherein the inorganic pigment is a titanium dioxide having an average crystal size of between 0.1 and 0.35 micron.

6. The pigment composition as characterized in claim 1, wherein the $CaCO_3$ is in the form of a ground powder.

7. The pigment composition as characterized in claim 6, wherein the $CaCO_3$ has a particle size of between 0.01 to 10 microns.

8. The pigment composition as characterized in claim 6, wherein the $CaCO_3$ has a particle size of between 0.1 to 1 microns.

9. The pigment composition as characterized in claim 1 having a pigment to $CaCO_3$ ratio of between 1:2 to 1:20.

10. The pigment composition as characterized in claim 1, having a pigment to $CaCO_3$ ratio of between 1:4 to 1:16.

11. The pigment composition as characterized in claim 1, wherein the pigment of (b) is an organic pigment selected from the group consisting of nitroso, nitromonoazo, diazo, disazo, basic dye, alkali blues, peacock blue lake, phloxine, quinacridones, lake of acid yellow, carbazole dioxazine violet, alizarine lake, vat, phthalocyanine and tetrachloroisoindolinone.

12. The pigment composition as characterized in claim 1, wherein the pigment of (b) is a metallic pigment selected from the group consisting of aluminum flakes, copper and copper alloy flake powders, zinc pigments and stainless steel flakes.

13. The pigment composition as characterized in claim 1, wherein the pigment of (b) is selected from the group consisting of inorganic pigments, organic pigments, metallic pigments, metal protective pigments, nacreous pigments, luminescent pigments, functional pigments and food, drug and cosmetic colors.

14. The pigment composition as characterized in claim 1, further comprising a binder.

15. The pigment composition as characterized in claim 1, further comprising at least one additive selected from the group consisting of dispersants, surfactants, defoamers, and thickeners.

16. The pigment composition as characterized in claim 1, further comprising at least one filler.

17. The pigment composition as characterized in claim 16, wherein the at least one filler is selected from the group consisting of silica, silicates, aluminates, sulphates, carbonates, and clays.

18. A method for preparing a pigment composition, free of gray pigments, comprising the steps of
  a. producing a slurry comprising between 17% to 40% by weight $CaCO_3$, as a pigment extender, in a solvent;
  b. adding a pigment to the slurry;
  wherein refraction of light of the composition does not substantially differ across the range of the calcium carbonate in the slurry;
  whereby increasing the calcium carbonate in the slurry compensates for a reduced amount of pigment in the composition.

19. The method for preparing a pigment composition as characterized in claim 18, wherein the solvent is selected from the group consisting of water, oils and long chain alcohols.

20. The method for preparing a pigment composition as characterized in claim 18, wherein the slurry comprises 18% to 30% $CaCO_3$ by weight.

21. The method for preparing a pigment composition as characterized in claim 19, wherein suitable additives are added to the $CaCO_3$ in solvent slurry to produce and maintain a uniform slurry.

22. The method for preparing a pigment composition as characterized in claim 19, further comprising the step of adding at least one additive to the slurry prior to the addition of the pigment, wherein the additive is selected from the group consisting of wetting agents, dispersants, surfactants, defoamers, preservative, buffers, coalescents, and thickeners.

23. The method for preparing a pigment composition as characterized in claim 22, further comprising the step of adding at least one binder selected from the group consisting of oils, varnishes, latex emulsions styrene, styrene butadiene, polyvinyl acetate, acrylic, acrylic-styrene, acrylic polyvinyl acetate and polyurethanes to the slurry prior to the addition of the pigment.

24. The method for preparing a pigment composition as characterized in claim 18, wherein the pigment of (b) is selected from the group consisting of inorganic pigments, organic pigments, metallic pigments, metal protective pigments, nacreous pigments, luminescent pigments, functional pigments and food, drug and cosmetic colors.

25. The method for preparing a pigment composition as characterized in claim 24, wherein the pigment of (b) is an inorganic pigment selected from the group consisting of titanium dioxide pigments, zinc oxide pigments, antimony oxides, barium pigments, calcium pigments, zirconium pigments, chromium pigments, iron pigments, magnesium pigments, lead pigments, zinc sulphide and lithopone.

26. The method for preparing a pigment composition as characterized in claim 24, wherein the pigment of (b) is an organic pigment selected from the group consisting of nitroso, nitromonoazo, diazo, disazo, basic dye, alkali blues, peacock blue lake, phloxine, quinacridones, lake of acid yellow, carbazole dioxazine violet, alizarine lake, vat, phthalocyanine and tetrachloroisoindolinone.

27. The method for preparing a pigment composition as characterized in claim 24, wherein the pigment of (b) is a metallic pigment selected from the group consisting of aluminum flakes, copper and copper alloy flake powders, zinc pigments and stainless steel flakes.

28. A coating composition, free of gray pigments, comprising:
  (a) 17 to 40% calcium carbonate ($CaCO_3$) by weight in the form of a ground powder having a particle size of between 0.1 to 1 microns that functions as a pigment extender;
  (b) a pigment that provides a dominant color of the coating composition and being present in a pigment to calcium carbonate ratio of between 1:2 to 1:20;
  (c) at least one additive selected from the group consisting of dispersants, surfactants, defoamers, and thickeners;
  whereby the refraction of light does not substantiall change relative to the amount of calcium carbonate in the composition and increased amounts of said calcium carbonate compensates for decreased amounts of said pigment in the coating composition.

29. The coating composition as characterized in claim 28, wherein said coating composition comprises between 18% and 30% calcium carbonate by weight.

30. The coating composition as characterized in claim 29, wherein the coating composition is an aqueous slurry.

* * * * *